United States Patent [19]

Shimizume et al.

[11] Patent Number: 4,979,192
[45] Date of Patent: Dec. 18, 1990

[54] CIRCUIT FOR DETECTING A SYNCHRONIZING SIGNAL

[75] Inventors: Kazutoshi Shimizume; Hirokazu Kuroda, both of Kanagawa, Japan

[73] Assignee: Sony Corporation, Tokyo, Japan

[21] Appl. No.: 286,714

[22] Filed: Dec. 20, 1988

[30] Foreign Application Priority Data

Dec. 23, 1987 [JP] Japan ................................ 62-325669

[51] Int. Cl.$^5$ .............................................. H04L 7/04
[52] U.S. Cl. ...................................... 375/111; 360/51
[58] Field of Search ............... 375/111, 116, 106, 108; 370/105, 105.1; 455/410; 360/51, 32

[56] References Cited

U.S. PATENT DOCUMENTS

| | | | |
|---|---|---|---|
| 4,453,260 | 6/1984 | Inazawa et al. | 370/105 X |
| 4,620,300 | 10/1986 | Ogawa | 375/112 X |
| 4,872,155 | 10/1989 | Yokogawa et al. | 375/113 |

Primary Examiner—Benedict V. Safourek
Assistant Examiner—Tesfaldet Bocure
Attorney, Agent, or Firm—Lewis H. Eslinger

[57] ABSTRACT

A circuit for detecting a synchronizing signal comprises a gate circuit to which a reproduced synchronizing signal and a window signal are supplied. A first counter synchronized with an output signal from the gate circuit counts a clock signal formed from the reproduced signal and generates an insertion synchronizing signal. A second counter synchronized with the output signal from the gate circuit counts a fixed clock signal and generates the window signal. The output signal from the gate circuit or the insertion synchronizing signal is made a synchronizing detection signal. The frame synchronizing signal can thus be detected stably and reliably.

5 Claims, 5 Drawing Sheets

CIRCUIT FOR DETECTING A SYNCHRONIZING SIGNAL

BACKGROUND OF THE INVENTION

1. Field of the Invention

The present invention relates to a circuit for detecting a synchronizing signal.

2. Description of the Prior Art

In the prior art, an apparatus for reproducing digital audio data recorded in an optical disk is known as an example to which a circuit for detecting a synchronizing signal according to the invention can be applied.

The reproduced signal of the digital audio data has a frame structure divided by a frame synchronizing signal. The reproduced signal is subjected to EFM (Eight-Fourteen) modulation, and in order to demodulate this, data within the frame must be distinguished with respect to the frame synchronizing signal. Therefore a circuit for detecting a synchronizing signal is installed.

As a matter of fact, the reproduced signal from the disk may include a signal similar to the frame synchronizing signal generated due to a flaw of the disk or the like, or a lack of the frame synchronizing signal may be produced. In order to deal with this problem, a protection circuit of the frame synchronizing signal is required. In such a detection and protection circuit of the synchronizing signal, for example, as disclosed in Japanese patent application laid-open No. 58-98813, protection by a window is performed in order to prevent detection of a signal other than the frame synchronizing signal from being mistaken for the synchronizing signal, and insertion protection is performed in order to deal with the lack of the frame synchronizing signal. Also, if the insertion protection continues a prescribed number of times, the window is opened until the reproduced synchronizing signal is obtained. When the window is opened, if the reproduced synchronizing signal is obtained, the window is immediately closed. In the detection and protection circuit of the synchronizing signal in the prior art, however, a bit clock formed in the PLL is used to form the window signal. Since the bit clock is synchronous with the reproduced signal, it varies in case the reproduced signal is disturbed by a flaw of the disk or the like. As a result, if the window is closed by an incorrect reproduced synchronizing signal, the timing of the window signal may be shifted, even when the correct frame synchronizing signal is obtained.

OBJECTS AND SUMMARY OF THE INVENTION

Accordingly, an object of the invention is to provide a circuit for detecting a synchronizing signal which eliminates the above-mentioned disadvantages in the prior art.

More particularly, a main object of the invention is to provide a circuit for detecting a synchronizing signal wherein the detection of the frame synchronizing signal can be performed stably in comparison to the prior art.

The invention is in a circuit for detecting a synchronizing signal, comprising a gate circuit to which the reproduced synchronizing signal and window signal are supplied, a first counter which is synchronized with the output signal from the gate circuit and counts a clock signal formed from the reproduced signal and generates an insertion synchronizing signal, and a second counter which is synchronized with the output signal from the gate circuit and counts a fixed clock signal and generates the window signal, wherein the output signal from the gate circuit or the insertion synchronizing signal is made a synchronizing detection output.

The invention is in another circuit for detecting a synchronizing signal, comprising a gate circuit to which the reproduced synchronizing signal and window signal are supplied, a first counter which is synchronized with the output signal from the gate circuit and counts the clock signal and generates the insertion synchronizing signal and the window signal, means for outputting a coincidence signal and noncoincidence signal respectively representing coincidence and noncoincidence between the output signal of the gate circuit and the insertion synchronizing signal, a second counter for counting the coincidence signal, and a third counter for counting the noncoincidence signal, wherein the window signal is controlled by the count value of the second and third counters, and the output signal from the gate circuit or the insertion synchronizing signal is made a synchronizing detection signal.

BRIEF DESCRIPTION OF THE DRAWINGS

FIG. 4A–4K and FIG. 5A–5K are timing charts illustrating operation of the frame synchronizing detecting circuit shown in FIG. 3.

DETAILED DESCRIPTION OF THE PREFERRED EMBODIMENTS

An embodiment of a circuit for detecting a synchronizing signal according to the invention will now be described referring to the accompanying drawings.

Figure 1:
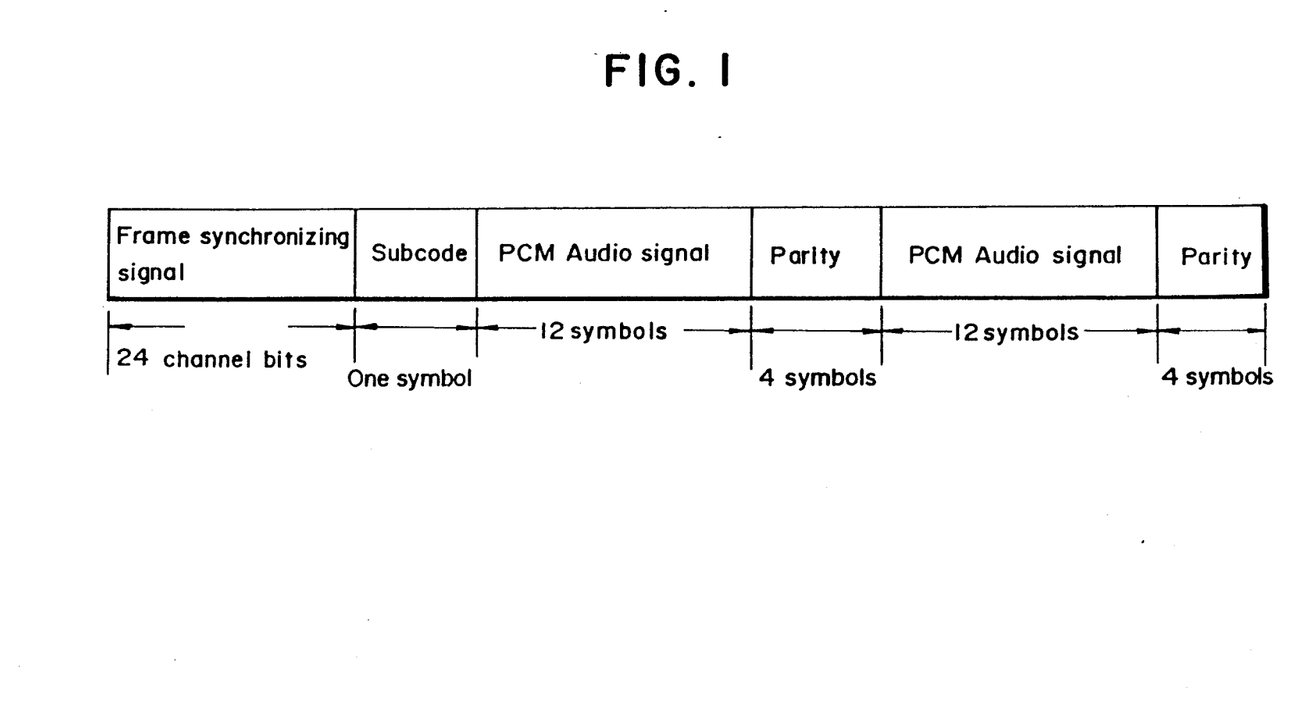
FIG. 1 is a schematic diagram illustrating the frame constitution of a reproduced digital signal representing audio data.

First, referring to FIG. 1, the frame constitution of modulated digital audio data recorded in an optical disk will be described. A frame synchronizing signal of 24 channel bits is positioned on the front of one frame, and one symbol of a subcode for control and indication is positioned next. Subsequently, a PCM audio signal of 12 symbols, a correction code, another PCM audio signal of 12 symbols and another parity signal of 4 symbols are positioned in sequence. One symbol is composed of 14 channel bits. Between each symbol and on both sides of the frame synchronizing signal are inserted 3 margin bits (not shown); therefore 3×34 margin bits exist per one frame. Consequently, one frame is constituted by 588 channel bits. This frame constitution is well known already, and the detailed description shall be omitted.

Figure 2:
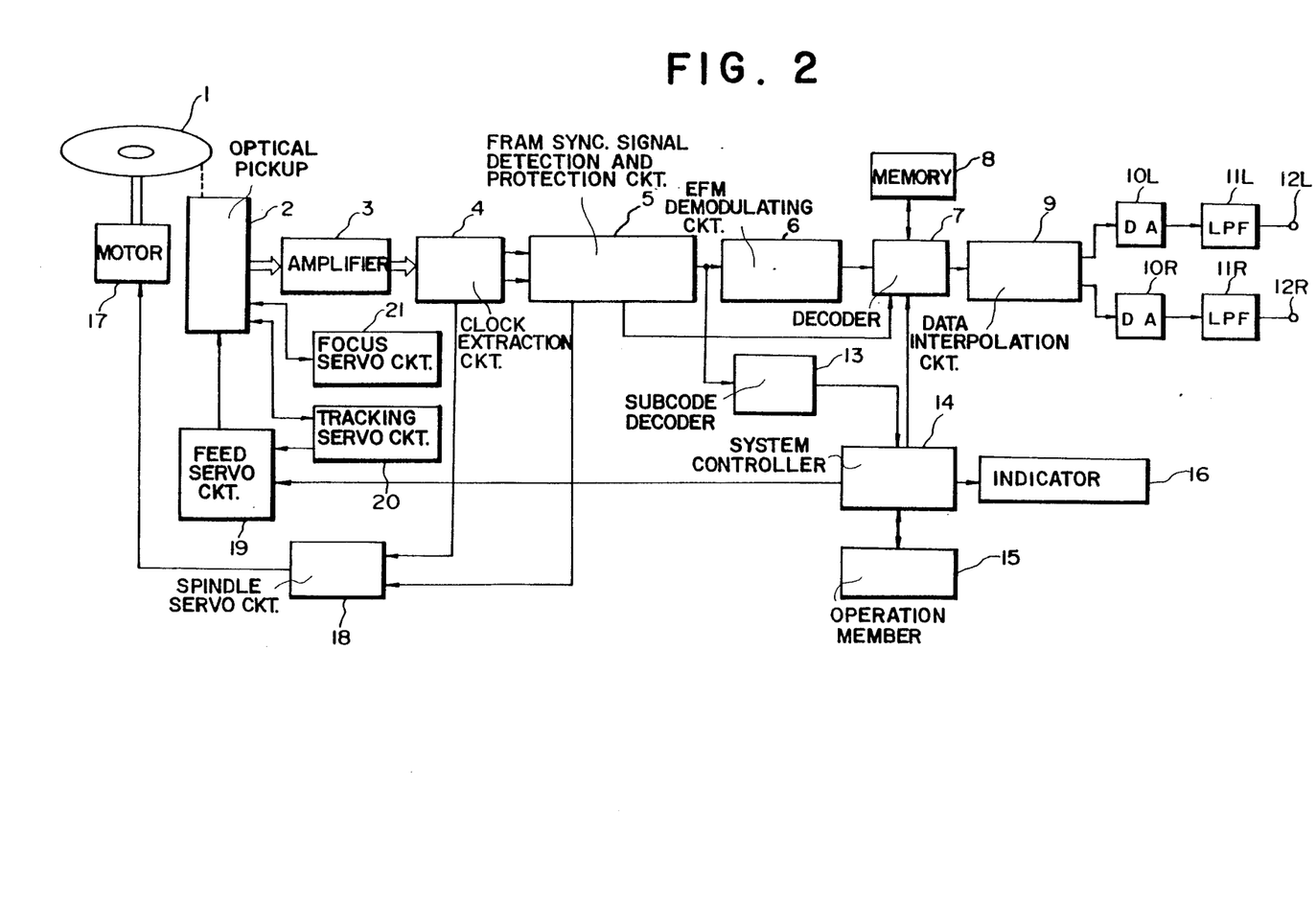
FIG. 2 is a block diagram illustrating an example of an apparatus for reproducing digital audio data to which a circuit for detecting a synchronizing signal according to the invention can be applied.

FIG. 2 shows an example of a player of an optical disk where digital audio data having the above-mentioned frame constitution is recorded. Modulated digital audio data reproduced from an optical disk 1 by an optical pickup 2 is supplied to a reproducing amplifier 3.

The output signal of the reproducing amplifier 3 is supplied to a clock extraction circuit 4 constituted by a PLL.

A reproduced data signal and a bit clock from the clock extraction circuit 4 are supplied to a frame synchronizing signal detection and protection circuit 5.

The frame synchronizing signal detection and protection circuit 5 detects the frame synchronizing signal and protects the detected frame synchronizing signal as hereinafter described.

An EFM demodulating circuit 6 is installed on the output of the frame synchronizing signal detection and protection circuit 5. The EFM modulation is channel coding which converts patterns of 8 bits of one symbol into prescribed patterns of 14 channel bits which can decrease the DC component and facilitate the extraction of the bit clock. Demodulated data with one symbol returned into 8 data bits by the EFM demodulator 6 is supplied to a decoder 7.

In the decoder 7, an error correction code called cross interleave Read-Solomon code is decoded whereby error correction is performed. A memory 8 in which the demodulated data is written for deinterleaving or the like is installed in relation to the decoder 7. A signal indicating that frame synchronization is not locked due to track jump or the like is supplied from the frame synchronizing signal detection and protection circuit 5 to the decoder 7.

Decoded digital audio data outputted from the decoder 7 is supplied to a data interpolation circuit 9. In the data interpolation circuit 9, interpolation such as mean value interpolation, previous value hold or the like is performed regarding the error data which could not be corrected by the decoder 7. Output signal of the data interpolation circuit 9 are supplied to D/A converters 10L and 10R, and respective output signals of these D/A converters 10L and 10R are taken as analog audio signals through low pass filters 11L and 11R to output terminals 12L and 12R.

A subcode decoder 13 is installed on the output side of the frame synchronizing signal detection and protection circuit 5. Subcode data obtained from the subcode decoder 13 is supplied to a system controller 14. An operation member 15 and an indicator 16 are installed in relation to the system controller 14.

A motor 17 to rotate the optical disk 1 is driven in CLV (Constant Line Velocity) by a spindle servo circuit 18. A feed servo circuit 19, a tracking servo circuit 20 and a focus servo circuit 21 are installed in relation to the optical pickup 2.

As above described, the player of the optical disk also is well known already, and further description shall be omitted.

Figure 3:
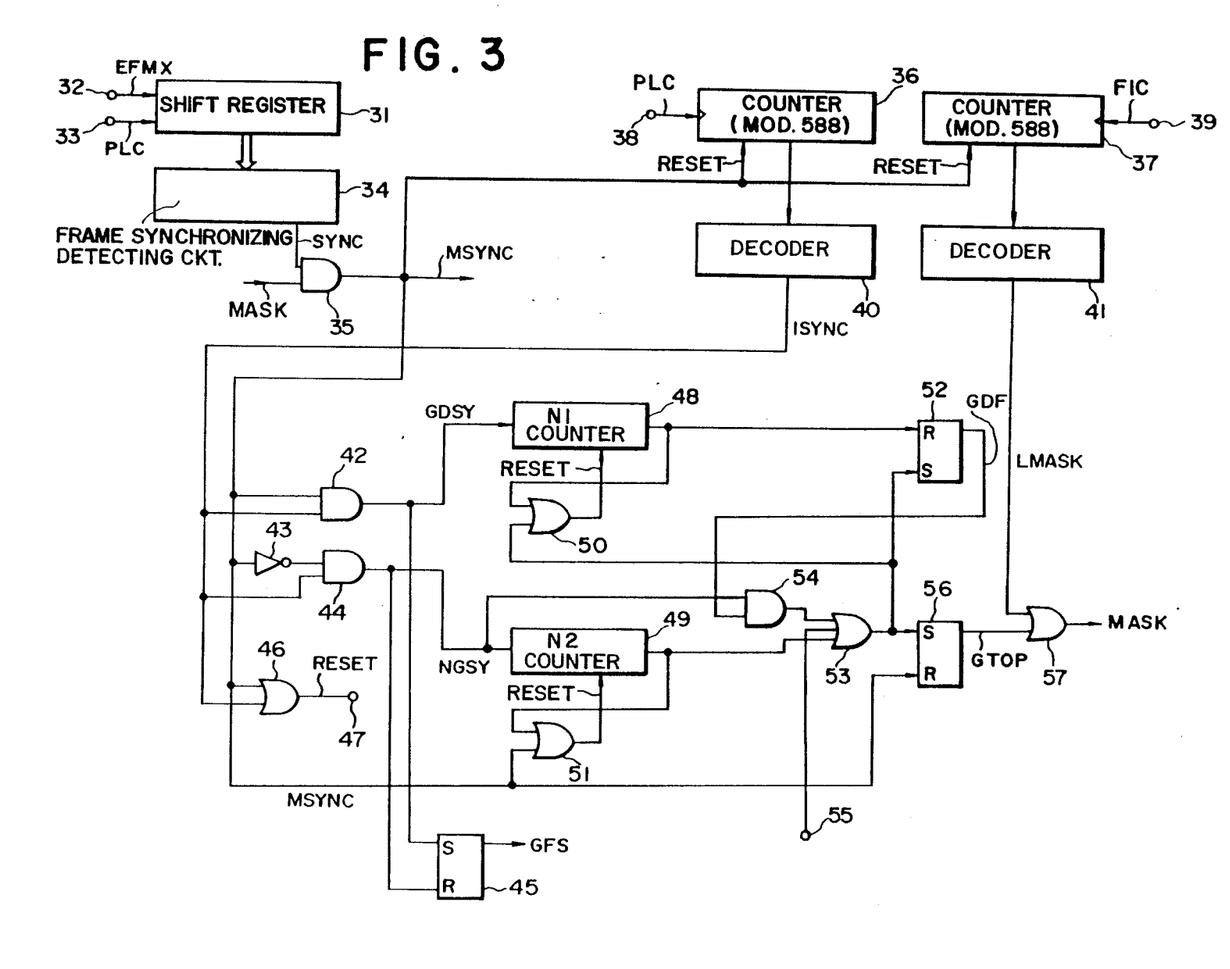
FIG. 3 is a block diagram illustrating an embodiment of a frame synchronizing detecting circuit according to the invention.

FIG. 3 shows an example of the frame synchronizing and detection and protection circuit 5. Reproduced data signal EFMX from a data input terminal 32 is taken in a shift register 31 by bit clock PLC supplied to a clock input terminal 33 and extracted from the reproduced data signal EFMX by the clock extraction circuit 4. The shift register 31 is of 23 bits, and output signal of the shift register 31 is supplied to a frame synchronizing detecting circuit 34. The frame synchronizing detection circuit 34 can detect a frame synchronizing signal of a prescribed bit pattern. The reproduced synchronizing signal SYNC from the synchronizing detection circuit 34 is supplied to the AND gate 35. The other input of the AND gate 35 is supplied with a window signal mask MASK as described hereinafter, and a detected synchronizing signal MSYNC is outputted.

On the other hand, counters 36 and 37 are constituted by counters of mod. 588 respectively. The counter 36 counts clock PLC from an input terminal 38, and the counter 37 counts clock FIC from an input terminal 39. The clock FIC is a fixed stable clock formed, for example, by a crystal oscillation circuit (not shown). The frequency of the clock FIG is 4.3218 MHz being equal to the center frequency of the clock PLC.

The outputs of the counters 36 and 37 are supplied to decoders 40 and 41 respectively. Insertion synchronizing signal ISYNC is generated from the decoder 40 every time the output of the counter 36 becomes 588, and window signal LMASK which becomes "1" in a width of ±8 clock pulses about the timing of the output of the counter 37 becoming 588 is generated from the decoder 41. The counters 36 and 37 are reset by detected synchronizing signal MSYNC from the AND gate 35.

The detected synchronizing signal MSYNC is supplied to an AND gate 42 and an inverter 43. The output signal of the inverter 43 is supplied to an AND gate 44. Insertion synchronizing signal ISYNC from a decoder 40 is supplied to these AND gates 42 and 44. Signal GDSY is taken from the AND gate 42, and signal NGSY is taken from the AND gate 44. The signal GSSY is that obtained when the detected synchronizing signal MSYNC and the insertion synchronizing signal ISYNC are generated simultaneously. The signal NGSY is that obtained when the insertion synchronizing signal ISYNC is generated but the detected synchronizing signal MSYNC is not generated. Also an RS flipflop 45 which is set and reset by these signals GDSY and NGSY is installed, and signal GFS is taken from the RS flipflop 45. The signal GFS represents that while this signal is outputted the correct frame synchronizing signal is obtained, and is supplied to a system controller or the like.

The insertion synchronizing signal ISYNC from the decoder 40 and the detected synchronizing signal MSYNC from the AND gate 35 are supplied to an OR gate 46, and reset signal RESET is taken from an output terminal 47. The reset signal RESET is an output signal to specify the timing corresponding to the frame synchronizing signal in the reproduced data signal. That is, each symbol of the reproduced data signal EFM is separated by a data clock with respect to the reset signal RESET.

As shown in FIG. 3, signal GDSY from the AND gate 42 is supplied as a clock input to an N1 counter 48. Signal NGSY from the AND gate 44 is supplied as a clock input to an N2 counter 49. Carry output of the N1 counter 48 is made the reset input of itself through an OR gate 50, and also made the reset input of an RS flipflop 52.

Carry output of the N2 counter 49 is made the reset input of itself through an OR gate 51, and supplied to an OR gate 53. Detected synchronizing signal MSYNC from the AND gate 35 is supplied as the other input of the OR gate 51. The output signal of an AND gate 54 and a signal from an input terminal 55 are supplied to the OR gate 53. The output signal GDF of the RS flipflop 52 and the signal NGSY from the AND gate 44 are supplied to the AND gate 54. The signal from the terminal 55 becomes "1" when a tracking error or the like is generated.

The output signal of the OR gate 53 is supplied as respective set inputs to SR flipflops 52 and 56, and made the reset input of the N1 counter 48 through the OR gate 54. The detected synchronizing signal MSYNC from the AND gate 35 is supplied as the reset input of the RS flipflop 56. Signal GTOP obtained as the output of the RS flipflop 56 is supplied to an OR gate 57. Window signal LMASK from the decoder 41 is supplied to the OR gate 57.

The N1 counter 48 is installed for such a protection as to detect that the signal GDSY is generated N1 times, i.e., that detection of the frame synchronization is locked. On the other hand, the N2 counter 49 is installed for such a protection as to detect that the signal NGSY is generated N2 times, i.e., that the lock has failed. For example, it is set 50 that (N1=2) and (N2=3).

Figure 4A:
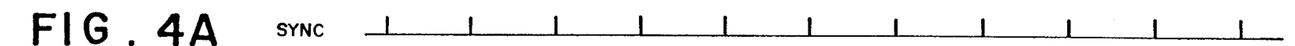
Figure 4B:
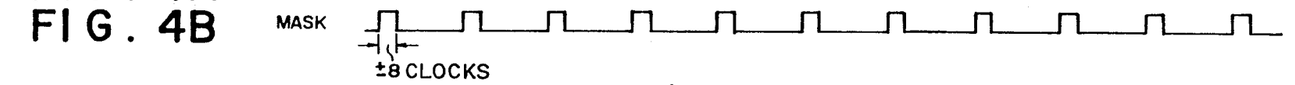
Figure 4C:
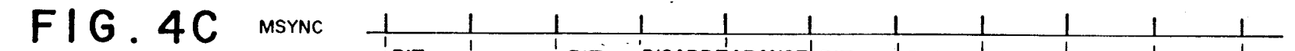
Figures 4D, 4E:
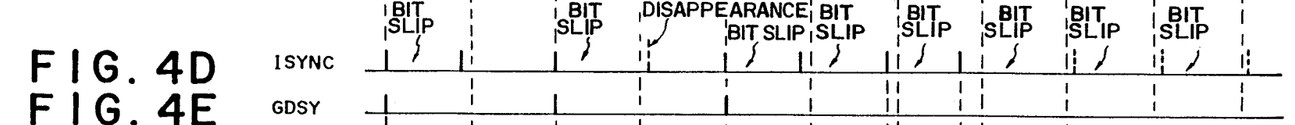
Figure 4F:
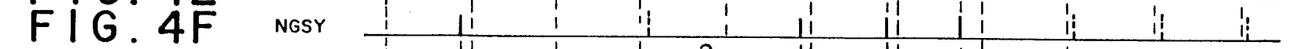
Figure 4G:
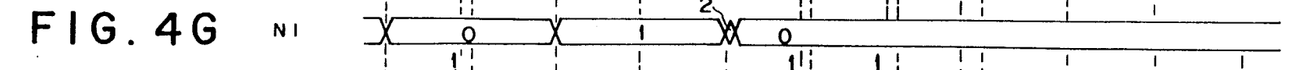
Figure 4H:
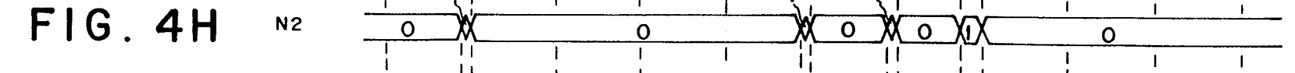
Figure 4I:
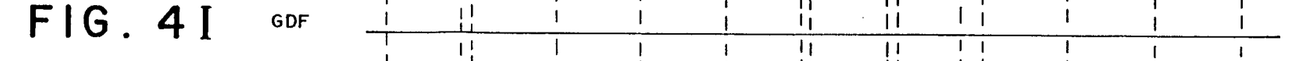
Figure 4J:
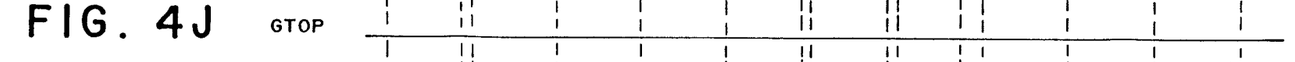
Figure 4K:
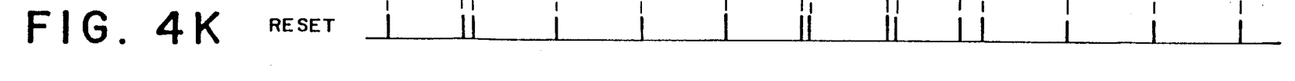

FIG. 4A-4K is a timing chart illustrating the operation of the embodiment when the detected synchronizing signal is detected correctly. FIG. 4A shows the reproduced synchronizing signal SYNC from the frame synchronizing detection circuit 34. FIG. 4B shows the window signal MASK supplied to the AND gate 35. Since the signal GTOP shown in FIG. 4J is "0" usually, the window signal LMASK with a width of ±8 clocks from the decoder 41 becomes the window signal MASK. Consequently, the detected synchronizing signal MSYNC as shown in FIG. 4C is obtained correctly.

Since the clock PLC has jitter, if the detected synchronizing signal MSYNC is reset before the counter 36 counts 588, the insertion synchronizing signal is not obtained. On the contrary, if the counter 36 counts 588 before reset by the detected synchronizing signal MSYNC, the insertion synchronizing signal ISYNC is outputted slightly early. Consequently, as shown in FIG. 4D, the insertion synchronizing signal ISYNC includes a bit slip with a period different from a normal one or shows a bit disappearance. From the detected synchronizing signal MSYNC and the insertion synchronizing signal ISYNC, the signal GDSY being the output of the AND gate 42 shown in FIG. 4E and the signal NGSY being the output of the AND gate 44 shown in FIG. 4F are formed.

If the detected synchronizing signal MSYNC and the insertion synchronizing signal ISYNC are coincident in the timing with the high frequency, as shown in FIG. 4G, the counter 48 to count the signal GDSY counts to 2 of the count value and therefore is reset by the carry output and also the RS flipflop 52 is reset. Consequently, the output signal GDF of the RS flipflop 52 is "0" as shown in FIG. 4I and therefore the AND gate 54 is not opened. Even if the signal NGSY is generated occasionally, since the N2 counter 49 does not count to 3 as shown in FIG. 4H and is reset by the detection synchronizing signal MSYNC, the carry output is not generated. Consequently, the RS flipflop 56 is not set, and since the output signal GTOP is "0" as shown in FIG. 4J, the window signal MASK is not opened and therefore an incorrect synchronizing signal is not detected.

Since the insertion synchronizing signal ISYNC and the detected synchronizing signal MSYNC are supplied to the OR gate 46 shown in FIG. 3, the reset signal RESET shown in FIG. 4K is taken to the output terminal 47. If both the insertion synchronizing signal ISYNC and the detected synchronizing signal MSYNC are produced in the reset signal RESET, the period between the insertion synchronizing signal ISYNC and the detected synchronizing signal MSYNC becomes the period of the burst error. However, the period of the burst error is relatively short, and therefore can be corrected by the error correction code of the digital audio disk.

Figure 5A:
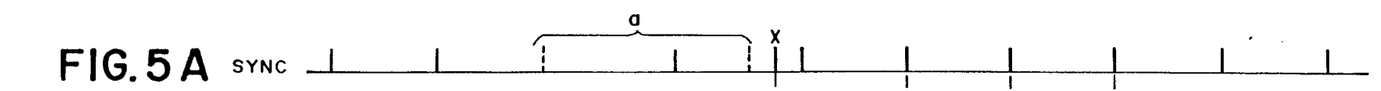
Figure 5B:
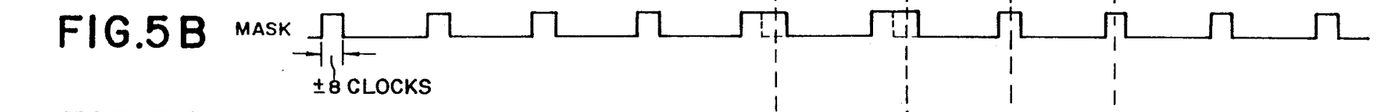
Figure 5C:
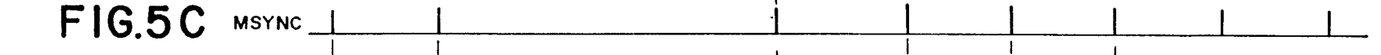
Figure 5D:
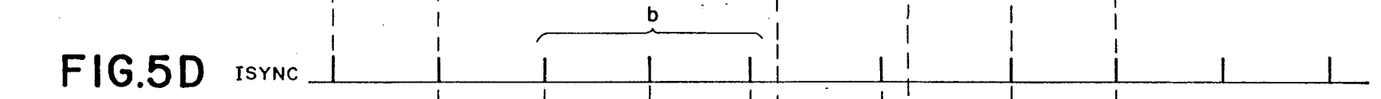
Figure 5E:
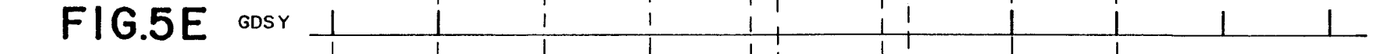
Figure 5F:
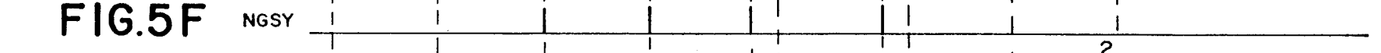
Figure 5G:
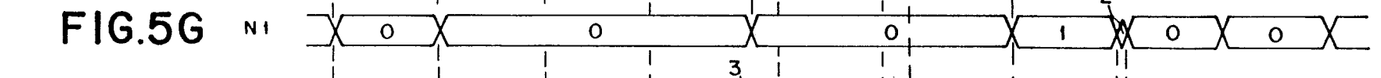
Figures 5H, 5I:
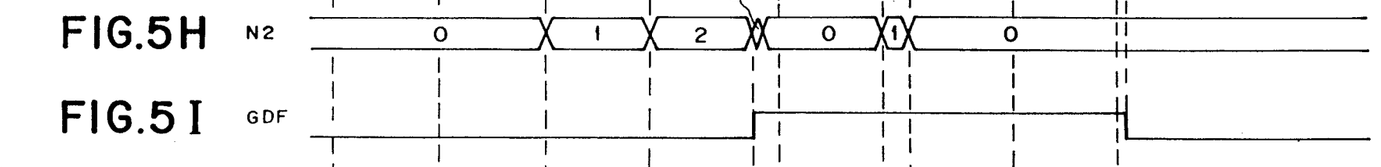
Figure 5J:
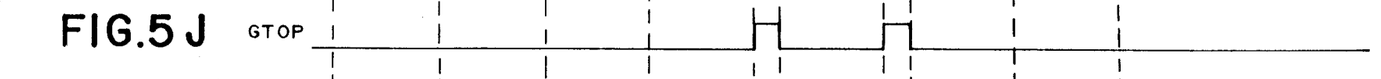
Figure 5K:
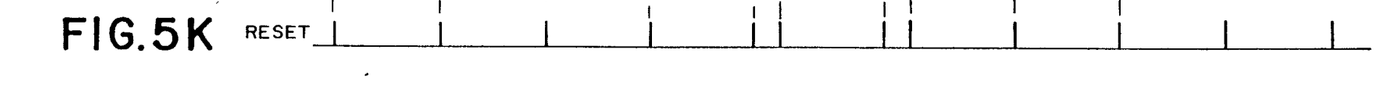

FIG. 5A-5K is a timing chart illustrating the operation in the embodiment when the reproduced synchronizing signal cannot be detected correctly due to a track jump or the like. As shown in FIG. 5A, if the reproduced synchronizing signal SYNC disappears continuously as indicated by "a" or is generated at a position shifted from the window signal MASK, every time the counter 36 counts 588, the insertion synchronizing signal ISYNC is obtained from the decoder 40, and reset signal RESET shown in FIG. 5K is obtained at the output terminal 47 of the OR gate 46 shown in FIG. 3B.

However, if the detected synchronizing signal MSYNC is not obtained, as shown in FIG. 5E, F, the signal GDSY from the AND gate 42 disappears and only the signal NGSY from the AND gate 44 is outputted. Consequently, the N1 counter 48 is not incremented as shown in FIG. 5G and only the N2 counter 49 is incremented as shown in FIG. 5H, and if it counts to 3, the carry output is generated and the RS flipflops 52 and 56 are set through the OR gate 53. Consequently, respective output signals GDF, GTOP become "1" as shown in FIG. 5I, 5J, and the window signal MASK is opened by the signal GTOP until the detected synchronizing signal MSYNC is obtained.

In this case, if the reproduced synchronizing signal SYNC is generated as indicated by symbol x in FIG. 5A, since the detected synchronizing signal MSYNC is outputted from the AND gate 35, the N2 counter 49 is reset through the OR gate 51, and the RS flipflop 56 is also reset and the output signal GTOP becomes "0" as shown in FIG. 5J. Since the counter 37 is also reset by the detected synchronizing signal MSYNC, the rear half of the window signal LMASK having a width of +8 clocks is outputted from the decoder 41 and the window signal MASK is outputted through the OR gate 57. Consequently, if the detected synchronizing signal MSYNC is obtained, the window signal MASK is closed after 8 clocks.

However, when the reproduced synchronizing signal SYNC is not correct, if the window signal MASK is formed only by the window signal LMASK afterwards, the correct reproduced synchronizing signal SYNC may remain undetected. Consequently, even if the reproduced synchronizing signal SYNC is detected, it is not trusted but the RS flipflop 52 is held to the set state until the GDSY from the AND gate 42 is generated three times. Consequently, if the NGSY from the AND gate 44 is generated even one time, the RS flipflop 56 is again reset through the AND gate 54 and the OR gate 53, and the window signal MASK is opened.

Thus the correct reproduced synchronizing signal SYNC is obtained, and if the signal GDSY is obtained two times from the AND gate 42, the carry output is generated from the N1 counter 48 and the RS flipflop 52 is reset and the output signal GDF becomes "0" as shown in FIG. 5I, and subsequently the operation is returned to the state shown in FIG. 4A-4K.

The reset signal RESET as shown in FIG. 5K is taken to the output terminal 47 of the OR gate 46. The burst error is produced during the period of the signal GTOP being "1". The error period can be reduced.

As clearly understood from the above description of operation, the N1 counter 48 performs an operation of such a protection as to detect that the detecting operation of frame synchronization is returned to normal, and the N2 counter 49 performs an operation of such a protection as to detect that the detecting operation of the frame synchronization is mistaken. The protection of both can detect rapidly that the detecting operation of frame synchronization becomes abnormal, and that the detecting operation is returned to normal.

According to the embodiments, since the counter counts the fixed clock signal and therefore forms the window signal, the window signal is generated in the prescribed timing which is not affected by the bit clock extracted from the regenerative signal. Consequently, when the normal frame synchronizing signal is generated, the frame synchronizing signal can be detected securely.

What is claimed is:

1. A circuit for detecting a synchronizing signal, said circuit comprising:
   means for reproducing a digital signal including a synchronizing signal from a record medium;
   means for supplying a fixed clock signal;
   means responsive to the reproducing means for generating a reproduced synchronizing signal;
   window means for generating a window signal;
   means for generating a reproduced clock signal;
   a gate circuit responsive to said reproduced synchronizing signal and window signal for producing a gate output signal; and
   first counter means responsive to said gate output signal for counting said reproduced clock signal and generating an insertion synchronizing signal;
   wherein said window means comprises second counter means responsive to said fixed clock signal and to said gate output signal for counting said fixed clock signal; and
   wherein said gate output signal or said insertion synchronizing signal is employed as a synchronizing detection output signal.

2. A circuit for detecting a synchronizing signal, said circuit comprising:
   means for reproducing a digital signal including a synchronizing signal from a record medium;
   means responsive to the reproducing means for supplying a reproduced synchronizing signal;
   means for generating a clock signal;
   a gate circuit responsive to said reproduced synchronizing signal and a window signal for producing a gate output signal;
   counter means responsive to said gate output signal for counting said clock signal and generating an insertion synchronizing signal and said window signal;
   means responsive to said gate output signal and said insertion synchronizing signal for outputting a coincidence signal and a noncoincidence signal respectively representing coincidence and noncoincidence between said gate output signal and said insertion synchronizing signal;
   coincidence counter means for counting the coincidence signal; and
   noncoincidence counter means for counting the noncoincidence signal,
   wherein the window signal is controlled by the count value of said coincidence and noncoincidence counter means one of, and said gate output signal and said insertion synchronizing signal is employed as a synchronizing detection output signal.

3. A circuit for detecting a synchronizing signal according to claim 1 wherein said gate circuit comprises an AND gate.

4. A circuit for detecting a synchronizing signal according to claim 2 wherein said gate circuit comprises an AND gate.

5. A circuit for detecting a synchronizing signal according to claim 2 wherein said coincidence counter means comprises an AND gate responsive to said gate output signal and said insertion synchronizing signal and said noncoincidence counter means comprises an AND gate and an inverter, said AND gate being responsive to said inverter and to one of said gate output signal and said insertion synchronizing signal, and said inverter being responsive to the other of said gate output signal and said insertion synchronizing signal for inverting the signal to which it is responsive.

* * * * *

UNITED STATES PATENT AND TRADEMARK OFFICE
CERTIFICATE OF CORRECTION

PATENT NO. : 4,979,192
DATED : December 18, 1990
INVENTOR(S) : Kazutoshi Shimizume It is certified that error appears in the above-identified patent and that said Letters Patent is hereby corrected as shown below:

Title Page, in References Cited, Patent No. 4,453,260, change "Inazawa" to --Inagawa--

Col. 2, line 49, change "a correction code" to

-- a parity signal of 4 symbols of an error correction code--

Col. 3, line 15, change "Read" tp --Reed-- line 16, before "whereby" insert --,--

Col. 5, line 9, change "50" to --so--

In the Claims:

Col. 8, line 20, change "means one of, and"

to-- means, and one of--

Signed and Sealed this

Seventeenth Day of November, 1992

Attest:

DOUGLAS B. COMER

*Attesting Officer*  *Acting Commissioner of Patents and Trademarks*